United States Patent [19]

Schoen

[11] 4,071,507

[45] Jan. 31, 1978

[54] PREPARATION OF LACTONE POLYESTERS

[75] Inventor: Löwhardt A. A. Schoen, Geleen, Netherlands

[73] Assignee: Stamicarbon, N.V., Geleen, Netherlands

[21] Appl. No.: 348,532

[22] Filed: Apr. 6, 1973

Related U.S. Application Data

[63] Continuation of Ser. No. 109,570, Jan. 25, 1971, abandoned.

[30] Foreign Application Priority Data

Jan. 29, 1970 Netherlands .......................... 7001237

[51] Int. Cl.$^2$ ............................................. C08G 63/10
[52] U.S. Cl. ................................. 260/78.3 R; 560/179
[58] Field of Search ....................... 260/78.3 R, 484 A

[56] References Cited

U.S. PATENT DOCUMENTS

| 2,890,208 | 6/1954 | Young et al. ...................... 260/78.3 |
| 3,021,314 | 2/1962 | Cox et al. ............................. 260/78.3 |
| 3,021,316 | 2/1962 | Cox et al. ............................. 260/78.3 |
| 3,169,945 | 2/1965 | Hostettler et al. .................. 260/78.3 |
| 3,498,957 | 3/1970 | Jacobson ............................. 260/78.3 |

FOREIGN PATENT DOCUMENTS 755,447 8/1956 United Kingdom ................ 260/78.3

*Primary Examiner*—Harold D. Anderson
*Assistant Examiner*—E. A. Nielsen
*Attorney, Agent, or Firm*—Cushman, Darby & Cushman

[57] ABSTRACT

An improved process for polymerization of lactones or mixtures of lactones in the presence of an initiator and a catalyst is disclosed wherein the initiator is an organic compound having at least one non-cyclic ester group and having no reactive hydrogen substituents. A polyester having blocked end groups is produced.

15 Claims, No Drawings

PREPARATION OF LACTONE POLYESTERS

This application is a continuation application of my earlier application Ser. No. 109,570 filed Jan. 25, 1971 and now abandoned.

The present invention relates to a process for polymerization of a lactone or a mixture of lactones in the presence of an initiator and a catalyst.

Polymerization of a lactone or mixtures of lactones in the presence of an initiator and a catalyst is employed to make softening agents for polyvinyl chloride and polyvinyl acetate. Known polymerization processes use an organic compound having at least one reactive hydrogen substituent, such as alcohols, amines and carboxylic acids as the initiator (see, for example, U.S. Pat. Nos. 2,878,236, 2,890,208 and 2,914,556). With the use of such an initiator, the polymerization process produces a polyester having reactive end-groups on the polyester chains. The reactive group renders the polyester less suitable for various applications because the polyesters containing the reactive groups are generally soluble in water and oils, degrade readily and exhibit a high degree of polarity.

To reduce the effect which the reactive end-groups have on the polyester, it has been proposed in U.S. Pat. No. 3,169,945 to block the reactive end-groups by an esterification treatment, such as boiling with an excess of an acid anhydride in case the end-groups on the polyester are hydroxyl.

Such an esterification of the end-groups, however, has not proved to be commercially attractive because the esterification reaction is generally attended by several undesirable side-reactions, such as degradation of the polyester chain into oligomer products. Further, it is difficult to achieve complete blocking of the end-groups by esterification, because the esterification reaction is not quantitative but rather an equilibrium reaction which does not proceed to completion. Therefore, the product obtained from the esterification reaction must be subjected to a rather costly purification.

According to the present invention, a process is provided which polymerizes lactones or a mixture of lactones, producing polyesters having blocked end-groups in one step. The process according to the present invention comprises polymerizing lactones or a mixture of lactones in the presence of a catalyst and an initiator being an aliphatic or aromatic organic compound of from 3 to 40 carbon atoms with at least one non-heterocyclic ester group and without a reactive hydrogen substituent and having the general formulas:

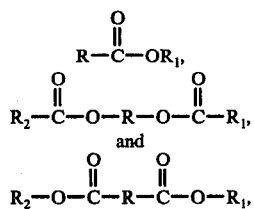

wherein R, $R_1$ and $R_2$ are independently selected from aliphatic and aromatic organic radicals of from 1 to 26 carbon atoms, possibly containing ether bridges, and having no reactive hydrogen substituents. The polyesters obtained have end-groups corresponding to the end grouping on the initiator and, therefore, do not contain reactive hydrogen substituents. The exceptional promoting effect of the organic compounds used as promoters in the present invention was highly unexpected, as initiators without reactive hydrogen substituents would not be expected to react with the lactone.

The acid number and the hydroxyl number are measures of the presence of reactive hydrogen substituents in the polyester. Polyesters can be produced according to the process of the present invention having an acid number of less than 0.01 and a hydroxyl number of less than 0.1 milligram-equivalents per gram of polyester. Such low acid numbers and hydroxyl numbers can be achieved even at very low molar weights of the polyester.

The lactones which can be used as starting materials in the process according to the present invention are chosen from those represented by the general formula:

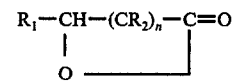

where $R_1$ and $R_2$ are members independently chosen from the group consisting of hydrogen, alkyl of from 1 to 9 carbon atoms, cycloalkyl of from 6 to 10 carbon atoms, or alkoxy-radicals of from 1 to 5 carbon atoms, and $n$ represents the number 1, 3, 4 or 5.

Examples of such lactones are: β-propiolactone, α,α-dimethyl-β-propiolactone, α-methyl-βpropiolactone, δ-valerolactone, methyl-δ-valerolactone, dimethyl-δ-valerolactone, ethyl-δ-valerolactone, methoxy-δ-valerolactone, ethoxy-δ-valerolactone, ε-caprolactone, methyl-ε-caprolactone, dimethyl-ε-caprolactone, cyclohexyl-ε-caprolactone, methoxy-ε-caprolactone, ethoxy-ε-caprolactone, ω-oenantholactone, methyl-ω-oenantholactone, dimethyl-ω-oenantholactone, ethyl-ω-oenantholactone, methoxy-ω-oenantholactone and ethoxy-ω-oenantholactone. If desired, the lactone may contain a stabilizer such as trialkyl phosphites or alkylated phenols to prevent the lactone from discoloring.

Examples of initiators which can be utilized in the invention are: ethyl acetate, propyl acetate, butyl acetate, 2-ethyl-hexyl acetate, ethyl benzoate, ethylene glycol diacetate, ethylene glycol dipropionate, ethylene glycol dibutyrate, ethylene glycol dibenzoate, diethylene glycol diacetate, diethylene glycol dipropionate, diethylene glycol dibutyrate, diethylene glycol dibenzoate, triethylene glycol diacetate, triethylene glycol dipropionate, triethylene glycol dibutyrate, triethylene glycol dibenzoate, dimethyl terephthalate, di-(2-ethylhexyl)-adipate, dimethyl adipate, diethyl adipate, dipropyl adipate, dibutyl adipate and dibenzyl adipate.

The properties of the lactone polyesters produced by the process of the present invention are, among others, determined by the initiator utilized, so the process offers the possibility of preparing lactone polymers having special properties. For example, when the lactone polyester is used to soften polyvinyl chloride, it is desirable for the lactone polyester to have aromatic end-groups which produce the favorable property of interfering with the so-called exudation of the softening agent from the polyvinyl chloride.

The molecular weight of the lactone polymer produced can be influenced within very wide limits by varying the concentration of the initiator. According to the invention, polymers having an average molecular weight in excess of 10,000, and up to an average molecular weight of 100,000 can be achieved. Lactone polyester with blocked end-groups and having an average molecular weight of more than 10,000 are not described in the literature because esterifying a lactone polyester, with an average molecular weight of more than 10,000 and containing reactive hydrogen substituents, results only in partial blocking of the end-groups.

Lactone polyesters with an average molecular weight of more than 10,000 and having essentially fully blocked end-groups can be produced by the process of the present invention. Such polyesters are extremely suitable not only as softening agent for polyvinyl chloride and polyvinyl acetate, but also for other applications such as increasing the clarity of polyethylene films and improving the dyeability of polypropylene fibers.

The process of the present invention is carried out with the aid of catalysts well known in the prior art for the polymerization of lactones. Examples of suitable catalysts are: sodium ethylate, sodium hydride, dibutyl magnesium, triethyl aluminum, sodium aluminum propylate, magnesium aluminum ethylate, dibutyltin oxide, tetrabutyl chlorohydroxydistannoxate, tetrabutyl dichloro distannoxate, hexabutyl dichloro tristannoxate and hexabutyl chlorohydroxytristannoxate. Preferably, dibutyltin oxide, tributyl dichlorodistannoxate, tetrabutyl chlorohydroxydistannoxate, hexabutyl chlorohydroxytristannoxate, hexabutyl dichlorotristannoxate, or mixtures thereof are utilized as catalyst to produce a lactone polymer of a very suitable quality at a very high polymerization rate. The catalyst concentration can be varied, however, a concentration of 0.01–2 weight % of catalyst, based on the lactone, is generally sufficient.

The process according to the present invention may be carried out at various temperatures. Preferably, a temperature of between 50° and 225° C. is maintained. At temperatures below 50° C., the reaction rate becomes quite slow and at temperatures exceeding 225° C., the lactone becomes quite volatile.

The pressure at which the polymerization of the present invention is carried out is not critical, and for economic reasons atmospheric pressure is preferred.

To minimize discoloration of the lactone polymer, the polymerization is preferably performed in the absence of oxygen such as, for instance, under a nitrogen or a rare gas atmosphere. After completion of the polymerization any residual monomer present in the reaction mixture can be removed, for instance, by removing the monomer from the polyester at elevated temperature and reduced pressures.

The process according to the present invention can be carried out continuously and in a batch-wise manner. The invention will be understood more readily by reference to the following examples; however, these examples are intended to illustrate the invention and are not to be construed to limit the scope of the invention.

EXAMPLE I

Glycol diacetate was added to ε-caprolactone to yield a mixture containing 4.45 mole % glycol diacetate based on the weight of ε-caprolactone and charged to a reactor vessel at atmospheric pressure. The reactor vessel was purged with dry nitrogen, and the subsequent polymerization reaction was accomplished in the absence of water. The monomer-initiator mixture (caprolactone-glycol diacetate mixture) was heated to 70° C. and the catalyst, sodium ethylate, was added (0.3 weight % based on the weight of ε-caprolactone) and the mixture stirred until the refractive index $\eta_D^{60}$ of the reaction mixture remained constant. The efficiency of monomer conversion was measured to be greater than 95%. The acid number of the polyester obtained was less than 0.01 milligram equivalent and the hydroxyl number less than 0.1 milligram equivalent per gram of polyester.

EXAMPLES II–XXIII

Using procedures similar to those described in Example 1, ε-caprolactone, δ-valerolactone, β-propiolactone and mixtures of ε-caprolactone and ε-methyl-ε-caprolactone were polymerized using various catalysts and initiators.

The polymerization conditions and results are listed in the following table. In the table the times indicated relate to the lapse of time from the addition of the catalyst until a constant refractive index, $\eta_D^{60}$, was obtained. The mole % of initiator and the weight % of catalyst are based on the total quantity of lactone used. The reduced viscosity, $[\eta]_{0.4}$, was determined in chloroform at 30° C. A reduced viscosity of 0.45 or larger indicates a polymer of molecular weight greater than 10,000. The tin catalyst was a mixture of tetrabutyl dichlorodistannoxate and hexabutyl dichlorotristannoxate. The results of Example 1 are also shown in the Table.

TABLE

| Example No. | MONOMER* | INITIATOR** | Initiator Concentration mole % | CATALYST | Catalyst Concentration wt. % | Temp. ° C. | Time min. | $[\eta]_{0.4}$ | Product |
|---|---|---|---|---|---|---|---|---|---|
| I | A | M | 4.45 | sodium ethylate | 0.3 | 70 | 0.25 | 0.24 | white wax |
| II | 80 mole % A 20 mole % B | M | 4.09 | sodium ethylate | 0.3 | 70 | 0.50 | 0.14 | light yellow unguent |
| III | A | M | 6.68 | dibutyltin oxide | 0.5 | 170 | 7 | 0.12 | white wax |
| IV | 90 mole % A 10 mole % B | M | 6.22 | tin catalyst | 0.5 | 170 | 12 | 0.13 | white wax |
| V | 70 mole % A 30 mole % B | M | 6.37 | tin catalyst | 0.5 | 150 | 15 | 0.12 | white wax |
| VI | A | M | 8.42 | tin catalyst | 0.5 | 170 | 10 | 0.09 | white wax |
| VII | A | M | 4.45 | tin catalyst | 0.5 | 170 | 6 | 0.12 | white wax |
| VIII | A | M | 2.67 | tin catalyst | 0.5 | 170 | 4 | 0.22 | white polymer |
| IX | A | M | 1.34 | tin catalyst | 0.5 | 170 | 3 | 0.35 | white polymer |
| X | A | M | 0.77 | tin catalyst | 0.5 | 170 | 2.5 | 0.45 | white polymer |
| XI | A | M | 0.38 | tin catalyst | 0.5 | 170 | 2 | 0.54 | white polymer |
| XII | A | M | 0.16 | tin catalyst | 0.5 | 170 | <1 | 0.98 | white polymer |
| XIII | A | N | 6.47 | tin catalyst | 0.5 | 170 | 20 | 0.22 | white wax |
| XIV | A | O | 4.03 | tin catalyst | 0.5 | 170 | 15 | 0.31 | white polymer |
| XV | A | P | 4.34 | tin catalyst | 0.5 | 170 | 22 | 0.38 | white polymer |
| XVI | A | Q | 6.52 | tin catalyst | 0.5 | 150 | 9 | 0.11 | white wax |
| XVII | A | Q | 4.18 | tin catalyst | 0.5 | 150 | 6 | 0.17 | white wax |
| XVIII | 70 mole % A 30 mole % B | Q | 4.33 | tin catalyst | 0.5 | 150 | 15 | 0.33 | white wax |
| XIX | A | R | 0.20 | tin catalyst | 0.5 | 150 | 10 | 0.38 | white polymer |

TABLE-continued

| Example No. | MONOMER* | INITIATOR** | Initiator Concentration mole % | CATALYST | Catalyst Concentration wt. % | Temp. ° C. | Time min. | $[\eta]_{0.4}$ | Product |
|---|---|---|---|---|---|---|---|---|---|
| XX | A | R | 0.70 | tin catalyst | 0.5 | 150 | 6 | 0.73 | white polymer |
| XXI | C | M | 1.37 | tin catalyst | 0.5 | 120 | 43.5 | 0.23 | white polymer |
| XXII | C | M | 0.34 | tin catalyst | 0.5 | 120 | 16 | 0.43 | white polymer |
| XXIII | D | M | 2.45 | tin catalyst | 0.5 | 120 | 240 | 0.10 | white polymer |

*A is ε-caprolactone
 B is ε-methyl-ε-caprolactone
 C is δ-valerolactone
 D is β-propiolactone
**M is glycol diacetate
 N is dimethyl terephthalate
 O is 2-ethyl-hexyl acetate
 P is di-(2-ethyl-hexyl)-adipate
 Q is glycol dibenzoate
 R is triethylene glycol diacetate In all the examples, the efficiency of monomer conversion was greater than 95%, the acid number less than 0.01 milligram equivalent, and the hydroxyl number less than 0.1 milligram equivalent per gram of polyester showing that any reactive end groups were essentially absent from the polyesters formed.

What is claimed is:

1. A process for preparing polymeric lactones free of terminal reactive hydrogen substituents comprising polymerizing a polymerizable lactone with an initiator and in the presence of a catalyst, said initiator selected from the group consisting of ethyl acetate, propyl acetate, butyl acetate, 2-ethyl-hexyl acetate, ethyl benzoate, ethylene glycol diacetate, ethylene glycol dipropionate, ethylene glycol dibutyrate, ethylene glycol dibenzoate, diethylene glycol diacetate, diethylene glycol diproprionate, diethylene glycol dibutyrate, diethylene glycol dibenzoate, dimethyl terephthalate, di-(2-ethyl-hexyl)-adipate, diethyl adipate, dipropyl adipate, dibutyl adipate, dibenzyl adipate, triethylene glycol diacetate, triethylene glycol dipropionate, triethylene glycol dibutyrate and triethylene glycol dibenzoate.

2. The process of claim 1 wherein the catalyst is selected from the group consisting of dibutyltin oxide, tetrabutyl dichlorodistannoxate, tetrabutyl chlorohydroxydistannoxate, hexabutyl dichlorotristannoxate and hexabutyl chlorohydroxytristannoxate.

3. The process of claim 1 wherein 0.01 to 2 grams of catalyst is used for 100 grams of lactone.

4. The process of claim 1 wherein the polymerization is carried out at a temperature in the range of about 50° C to about 225° C.

5. The process of claim 1 wherein the lactone is a mixture of ε-caprolactone and ε-methyl-ε-caprolactone, the catalyst is sodium ethylate and the initiator is glycol diacetate.

6. The process of claim 5 wherein the molecular weight of the polymer is from 10,000 to 100,000.

7. The process of claim 1 wherein the lactone is ε-caprolactone, the catalyst is a mixture of tetrabutyl dichlorodistannoxate and hexabutyl dichlorotristannoxate and the initiator is glycol diacetate.

8. The process of claim 7 wherein the molecular weight of the polymer is from 10,000 to 100,000.

9. The process of claim 1 wherein the lactone is ε-caprolactone, the catalyst is a mixture of tetrabutyl dichlorodistannoxate and hexabutyl dichlorotristannoxate and the initiator is dimethyl terephthalate.

10. The process of claim 9 wherein the molecular weight of the polymer is from 10,000 to 100,000.

11. The process of claim 1 wherein the lactone is ε-caprolactone, the catalyst is a mixture of tetrabutyl dichlorodistannoxate and hexabutyl dichlorotristannoxate and the initiator is di-(2-ethylhexyl)-adipate.

12. The process of claim 11 wherein the molecular weight of the polymer is from 10,000 to 100,000.

13. The process of claim 1 wherein the polymer has a reduced viscosity of at least 0.09.

14. The process of claim 1 wherein the lactone polymerized is γ-caprolactone, the catalyst is a mixture of tetrabutyl dichlorodistannoxate and hexabutyl dichlorotristannoxate and the initiator is di-(2-ethylhexyl)-adipate.

15. The process of claim 1 wherein the molecular weight of the polymer is from 10,000 to 100,000.

* * * * *